(12) United States Patent
Sejourne

(10) Patent No.: US 8,887,898 B2
(45) Date of Patent: Nov. 18, 2014

(54) CONVEYOR ROLL WITH CENTRIFUGAL FORCE-OPERATED MAGNETIC BRAKE

(75) Inventor: Jerome Sejourne, Saint-Diery (FR)

(73) Assignee: Interroll Holding AG, Sant'antonino (CH)

( * ) Notice: Subject to any disclaimer, the term of this patent is extended or adjusted under 35 U.S.C. 154(b) by 0 days.

(21) Appl. No.: 13/641,316

(22) PCT Filed: Apr. 14, 2011

(86) PCT No.: PCT/EP2011/001904
§ 371 (c)(1),
(2), (4) Date: Dec. 21, 2012

(87) PCT Pub. No.: WO2011/128102
PCT Pub. Date: Oct. 20, 2011

(65) Prior Publication Data
US 2013/0087433 A1 Apr. 11, 2013

(30) Foreign Application Priority Data
Apr. 14, 2010 (EP) .................................. 10290202

(51) Int. Cl.
*B65G 13/06* (2006.01)
*B65G 13/075* (2006.01)

(52) U.S. Cl.
CPC .................................. *B65G 13/075* (2013.01)
USPC ........................................ 198/791; 193/35 A

(58) Field of Classification Search
USPC ........................................................ 198/791
See application file for complete search history.

(56) References Cited

U.S. PATENT DOCUMENTS

| 3,312,320 | A | * | 4/1967 | Froio | 193/35 A |
| 3,352,397 | A | * | 11/1967 | Becker et al. | 193/35 A |
| 6,086,005 | A | * | 7/2000 | Kobayashi et al. | 242/288 |
| 6,126,105 | A | * | 10/2000 | Yamaguchi | 242/288 |
| 7,631,829 | B2 | * | 12/2009 | Tsutsumi | 242/288 |
| 2002/0134643 | A1 | | 9/2002 | Schmale et al. | |
| 2009/0101466 | A1 | | 4/2009 | Karcher | |

FOREIGN PATENT DOCUMENTS

| DE | 7300091 | 4/1973 |
| DE | 202 12 979 | 2/2003 |
| EP | 1 243 528 | 9/2002 |
| EP | 1 847 485 | 10/2007 |
| JP | 8-208011 | 8/1996 |

OTHER PUBLICATIONS

International Search Report with Written Opinion.

* cited by examiner

*Primary Examiner* — William R Harp
(74) *Attorney, Agent, or Firm* — Gerald E. Hespos; Michael J. Porco; Matthew J. Hespos

(57) ABSTRACT

A conveyor roller (10) has a cover (20), an axle (40), and a magnetic brake (50) having a magnetic component (51) and a braking component (54). The cover (20) is supported rotatably about an axis of rotation relative to the axle (40). The magnetic brake (50) is provided kinematically between the axle (40) and the cover (20) and is connected to the axle (40) and the cover (20) so that rotation of the cover (20) about the axis of rotation can be retarded by the magnetic brake (50). The magnetic component (51) and the braking component (54) are arranged displaceably relative to each other between a rest position and a braking position. A centrifugal device (60) for a rotational speed-dependent displacement of at least one of the magnetic brake components (51, 54) is provided between the rest position and the braking position.

14 Claims, 7 Drawing Sheets

C - C

CONVEYOR ROLL WITH CENTRIFUGAL FORCE-OPERATED MAGNETIC BRAKE

BACKGROUND OF THE INVENTION

1. Field of the Invention

The invention relates to a conveyor roller and to a conveyor path comprising such a conveyor roller.

2. Description of the Related Art

Roller conveyors with rollers exist in the prior art. These roller conveyors are used, for example, in rack storage systems, wherein a rack can have a plurality of roller conveyors arranged above and alongside one another. A plurality of pallets with goods can be mounted one behind the other on a roller conveyor, these pallets running on the rollers.

The roller conveyors are generally loaded either from one side and unloaded from the other side, so that the goods that pass onto the roller conveyors first are also unloaded again first therefrom. These rack storage systems are called first-in/first-out storage systems or FIFO storage systems. Some of these FIFO roller conveyors have an inclination which slopes from the loading point to the unloading point, so that pallets located on the roller conveyor are conveyed in the direction of the unloading point by gravitational force.

In another alternative, the roller conveyors are loaded from one side and unloaded from the same side, so that the goods that pass onto the roller conveyors last are unloaded first therefrom. These rack storage systems are called last-in/first-out storage systems or LIFO storage systems. Some of these storage systems also have an inclination in the direction of the loading or unloading point. When loading a further new pallet, for example by means of a forklift truck, the pallets that are already located on the roller conveyor are pushed rearward by the new pallet counter to the inclination. Moreover, this inclination has the effect that the pallets located on the roller conveyor always line up at the unloading point following the gravitational force.

In order to brake the speed of the pallets in the roller conveyors, the rollers of the conveyor paths are in part provided with brakes via which the speed of the rollers, and hence that of the pallets, can be retarded. It can thereby be prevented that the pallets run against one another at excessively high speed.

In some constructions, eddy-current brakes are used for this. Such a device for braking individual rollers of roller tracks is described in DE 7300091 U. A further construction is described in EP 1 243 528 A1.

Moreover, mechanical centrifugal brakes can be used, for example, in which the brake pads of the brakes are only contacted with corresponding braking surfaces at a specific rotational speed and are then pushed more strongly against the braking surfaces when the rotational speed increases due to the centrifugal force. Thus, it is ensured that the rollers can rotate in a non-retarded manner at a low speed. For higher speeds, an ever greater braking force is provided, so that exceeding of specific speeds can be prevented. A braking roller of that type is described in DE 202 12 979 U1, for example.

Retarded rollers of that type can be damaged or destroyed in particular in the case of LIFO conveyors, for example if pallets are pushed, for example by means of a forklift truck, at excessively high speed and with great pushing force onto the roller conveyors counter to the inclination of the conveyor path. In this case, the centrifugal brakes are activated and the pallets are pushed against the braking force by the forklift truck with great force. Since it is difficult to design the rollers and the included braking devices in a sufficiently stable way with reasonable economic outlay, the rollers can be damaged thereby. As a result, additional repair and maintenance costs may arise. To solve this problem, EP 1 847 485 A1 suggests providing freewheel in the braking roller, so that the braking effect of the described centrifugal brake is only provided in one direction of rotation.

It is the object of the invention to provide a compact conveyor roller and a conveyor path comprising at least one such conveyor roller, which can be produced in a cost-effective manner, which have a long service life and require low maintenance and/or repair costs during their service life.

SUMMARY OF THE INVENTION

A first independent aspect for solving the object relates to a conveyor roller, comprising a covering element, an axle element, and a magnetic brake having a magnetic component and a braking component corresponding to the magnetic component, the covering element being rotatably supported about an axis of rotation relative to the axle element, the magnetic brake being kinematically provided between the axle element and the covering element and being connected to the axle element and the covering element such that a rotation of the covering element about the axis of rotation can be retarded by the magnetic brake, wherein the magnetic component and the braking component are arranged displaceably relative to each other between a rest position and a braking position, and wherein further a centrifugal device for a rotational speed-dependent displacement of at least one of the magnetic brake components is provided between the rest position and the braking position.

The magnetic brake can be configured as an eddy-current brake, a hysteresis brake, or as a generator. An eddy-current brake is a wear-free brake that makes use of eddy-current losses. Here, an electrically conductive braking component, such as a metal disk or a metal tube, which can be formed as a rotor or as a stator, is moved in an external magnetic field generated by one or a plurality of permanent magnets or electromagnets, whereby currents are created in the braking component, which in turn generate a magnetic field that is opposed to the external magnetic field and thus brakes the braking component. The electrical resistance of the metal plate forms an ohmic load for the eddy currents, whereby the kinetic energy is converted to heat. In an eddy-current brake, the magnetizability of the braking component is not of importance for the induction, only the electrical conductivity is decisive. An advantage of eddy-current brakes is that they are maintenance-free. A hysteresis brake is a brake that is based on the effect of one or more magnets, such as a permanent magnet or an electromagnet, on a braking component moving relative to the magnet, said braking component comprising a ferromagnetic material. Here, the motion of the ferromagnetic material in the magnetic field leads to a continuous remagnetization of the ferromagnetic material. In contrast to an eddy-current brake, the generated force/the generated momentum is not speed or rotational speed-dependent in a hysteresis brake, i.e. the hysteresis brake operates uniformly from a standstill to a constructively possible maximum speed or rotational speed. Hysteresis brakes are also characterized by a particularly long service life.

The term "kinematically between" means that the magnetic brake is arranged along a brake train between the axle element and the covering element, so that a braking torque generated by the brake can be supported on the axle element on the one hand, and transferred to the covering element on the other hand. The magnetic component has at least one magnet, which can be formed as an integral constituent of the magnetic component or which can be fixed on a magnet carrier of the magnetic component as a separately produced component part. In particular, it is conceivable that several magnets are fixed to a magnet carrier. The braking component can be made of copper, or another metal, or of an alloy, in particular of a brass material. Such a brass material may have a zinc content of between 5% and 15% (percent by weight). A material of that type has a good electrical conductivity and can dissipate heat well. A covering element refers to a component part or a group of component parts, which provide(s) a circular-cylindrical outer surface of the braking roller. The term "relative to each other in a displaceable manner" means that at least one of the magnetic brake components (magnetic component or braking component) is displaceable.

The axle element can be part of a one-part or multi-part axle, on which the conveyor roller can be rotatably mounted to a conveyor frame. The axle element(s) can be fastened in a rotationally fixed manner to a roller frame. The covering element can be supported on the axle via one or more bearings. Such a bearing can be a roller bearing or a plain bearing.

The term braking position refers to a position of the magnetic component relative to the braking component in which upon a rotation of the magnetic component relative to the braking component, there is generated a braking torque between the magnetic component and the braking component. The term rest position refers to a position of the magnetic component relative to the braking component in which upon a rotation of the magnetic component relative to the braking component, there is generated no or almost no braking torque between the magnetic component and the braking component.

The centrifugal device can be configured and coupled with at least one of the magnetic components such that for a rotational speed-dependent operation, at least one of the magnetic brake components is displaceable from the rest position to the braking position and/or from the braking position to the rest position due to the operation of the centrifugal device.

Developing the claimed conveyor roller, one found that the use of conventional eddy-current brakes can be disadvantageous if a braking effect is created by the eddy-current brake already in the lower speed range, since thereby the start of particularly lightweight goods to be conveyed on conveyor paths with a particularly flat inclination can be influenced negatively. By means of the claimed construction, in which the magnetic component and the braking component can be brought into a rest position relative to each other, the braking effect of the eddy-current brake can be reduced to almost zero, so that the starting torque of the retarded conveyor rollers can be reduced. Thus, it is possible to increase the weight area of goods transportable on a conveyor path with such conveyor rollers.

One embodiment relates to the above-described conveyor roller, wherein the magnetic component has a magnet carrier and at least one magnet fixed to the magnet carrier.

In the case of a plurality of magnets, they can be arranged such that the areas of the magnets with the largest field strength, which usually form a pole of the magnet, in the braking position, are arranged with respect to the braking component such that the field lines in the areas with the largest field strength (in the following referred to as pole field lines) face in the direction of the braking component. Here, the magnets can be arranged such that the polarities alternate from one pole to the immediately adjacent pole.

Such an embodiment can be realized in different variants. In a first variant, the magnet carrier can be connected with components of the conveyor roller in the inside of the covering element and rotate relative to the covering element upon movement of the conveyor roller. In a second variant, the magnet carrier can be connected with the covering element in a rotationally fixed manner, so that the magnet carrier rotates together with the covering element and with the same rotational speed as the covering element. Here, the magnets can be arranged on an annular pole shoe of a ferromagnetic material, which increases the magnetic flow. The annular pole shoe, in turn, can be arranged on a disk-shaped plate, in particular on a disk-shape side cover of the conveyor roller, which is connected with the covering element. Between the magnets and the covering element can be formed a circular gap, into which the braking component can be displaced toward the braking position. If the disk-shaped plate and/or the covering elements is/are also formed of a ferromagnetic material, the magnetic flow can be further increased in the circular gap.

A further embodiment relates to one of the above-described conveyor rollers, wherein the braking component is formed as a tube portion with a circular-cylindrical cross section.

In this embodiment, the magnets of the magnetic component can be arranged such that the pole field lines extend radially outward with respect to the axis of rotation of the covering element. For example, a magnetic component, which in the braking state is arranged within and/or outside of the braking component formed as a circular-cylindrical tube portion, can generate a magnetic field in which the braking component rotates relative to the magnetic field and passes substantially perpendicularly through the respective pole field lines.

A further embodiment relates to one of the above-described conveyor rollers, in which the magnet carrier rotates in the inside of the covering element relative to the covering element, wherein the braking component is configured as a fixed component of the covering element, and wherein in the braking position the magnetic component is displaced at least partially within the braking component in a direction parallel to the axis of rotation of the covering element.

The magnetic component can also be arranged fully within the covering element in the braking position. The braking component can be formed by an integral portion of the covering element, i.e. be produced together with another area of the covering element as one piece, or be connected with the covering element, e.g. by a press fit, as a separate component part. In the case of a braking component formed as a circular-cylindrical tube portion, the braking component can be pressed into the circular-cylindrical inner circumferential area of the covering element e.g. by a press fit, so that a good heat transfer between the braking component and the covering element is achieved due to the tight contact between the outer circumference of the braking component and the inner circumferential area of the covering element. Other fits are conceivable as well. Further, the braking component can be screwed in the covering element. Compared with a smooth contact surface, a screw thread has the advantage of an enlarged surface that ensures an even better heat dissipation. Other ways of fastening are conceivable as well.

In another embodiment, in particular in an embodiment in which the magnet carrier is connected with the covering element in a rotationally fixed manner, the braking component can be connected with components of the conveyor roller in the inside of the covering element and rotate relative to the covering element upon movement of the conveyor roller.

Yet another embodiment relates to one of the above-described conveyor rollers, wherein the magnetic component, in the rest position, is arranged outside the braking component formed as the circular-cylindrical tube portion in a direction parallel to the axis of rotation of the covering element.

In the rest position, the magnetic component can be arranged partially or fully outside the braking component, i.e. it can be displaced to the rest position. The term "fully outside" as used herein means that there exists a plane, which is spanned by radii on a point of the axis of rotation and which in the rest position intersects neither the magnetic component nor the braking component. Thereby, it can be ensured that the braking component, in the rest position, is arranged almost fully outside a magnetic field of the magnetic component, so that almost no braking effect is created upon a rotation of the braking component relative to the magnetic component. In other embodiments, a partial overlap of magnetic component and braking component can be admissible. In both cases, a low braking effect in the rest position is envisaged. For example, a low braking effect can be in a range in which the braking torque, which is generated between the braking component and the magnetic component in the rest position, is smaller than the braking influence of other components of the conveyor roller, such as the friction in bearings and/or in the gearing of the conveyor roller. In the rest position, the braking torque between the braking component and the magnetic component, which results from the magnetic field, can e.g. be smaller than 1.2 Nm for a speed between the braking component and the magnetic component of 0.1 m/s. Thereby, a start of the conveyor roller after a standstill can be eased further.

A further embodiment relates to one of the above-described conveyor rollers, wherein the conveyor roller further has a gearing, the gearing being arranged within the conveyor roller such that via the gearing, a rotary relative movement between the covering element and the axle element can be converted into a rotary driving motion of a brake drive of the magnetic brake.

The gearing can be arranged in the conveyor roller, in particular fully within the covering element of the conveyor roller. The brake drive can be arranged on the braking component and/or on the magnetic component, so that one of the components or both of the components can be driven in a rotary manner such that the braking component and the magnetic component rotate relative to each other. By means of a gearing ratio of the gearing, it is possible to have the braking component rotate faster relative to the magnetic component than the covering element relative to the axle element. A selected gearing ratio can be in a range between 1:3 and 1:36, for example. Such a gearing can be a planetary gearing operable in a double-shaft operation and/or in a three-shaft operation and/or in a multiple-shaft operation. Here, a first gearing drive can be formed by the covering element or a part that is connected, in particular connected in a rotationally fixed manner, with the covering element. A second gearing drive can be formed by the axle element or a part that is connected, in particular connected in a rotationally fixed manner, with the axle element. A gearing drive can be connected with the brake drive. Preferably, a single-stage or multistage planetary gearing in the two-shaft operation or three-shaft operation is used. Here, the drive in the axle element can be set, in particular be set in a rotationally fixed manner, in relation to the mounting of the conveyor roller in a roller frame. It is also possible to drive the axle element separately, e.g. externally, so that the relative speed between the drives can be varied and the braking effect be adjusted thereby.

For example, even for a relatively slow speed of rotation of the covering element, a sufficient braking force can be obtained due to a high relative rotational speed between the braking component and the magnetic component. In addition, the brake drive can be connected with the centrifugal device, so that they can rotate together. Thereby, a sufficient centrifugal force in the centrifugal device for actuating the centrifugal device and the associated displacement of at least one of the magnetic brake components (magnetic component or braking component) can be achieved.

A further embodiment relates to one of the above-described conveyor rollers, wherein the brake drive is formed as a gear of the gearing of the magnetic brake.

Accordingly, the gear of the gearing can be connected, in particular be integrally connected, with at least one of the magnetic brake components, for example, and drive them in a rotary manner. With a corresponding design, installation space can be saved in the axial direction of the brake drive.

A further embodiment relates to one of the above-described conveyor rollers, wherein the brake drive is connected to the magnetic component such that the brake drive is provided as displaceably supported and jointly rotarily drivable together with the magnetic component.

Alternatively, in a further embodiment, the brake drive can be connected with the braking component such that the brake drive is provided as displaceably supported and jointly rotarily drivable together with the braking component.

Accordingly, the brake drive, in particular a brake drive embodied as a gear of the gearing, can be connected with the magnetic component or the braking component and drive it in a rotary manner. By being supported in a displaceable manner, the magnetic component or the braking component can be displaced between a rest position and a braking position. Here, the displaceable support can be a slid support on an axle, for example, in particular on the axle element, so that the brake drive can be displaced in a direction parallel to the axis of rotation of the brake drive. If the brake drive is embodied as a gear of the gearing, the gearing can be fully pushed into the gearing in the braking position of the magnetic component or the braking component, so that the gear can be engaged with corresponding gears substantially across the whole tooth flank width, so that a large torque can be transferred. In the rest position, the gear can be largely withdrawn from the gearing, so that only a part of the tooth flank width is engaged with the corresponding gears. In the rest position, despite of the little overlap of the engaged teeth, the gear can still be driven in a rotary manner even if only little torque can be transferred due to the little overlap. For example, the engagement length of the engaged teeth in the rest position can only be 20% of the engagement length in the braking position. It is also conceivable that merely an engagement length of 10% or less is provided in the rest position.

A further embodiment relates to one of the above-described conveyor rollers, wherein the gearing has at least one planetary gearing having a sun gear and at least one planetary gear, and wherein a portion of the brake drive is formed as the sun gear of the at least one planetary gearing, which is supported in a displaceable manner relative to the at least one planetary gear in a direction parallel to the axis of rotation of the sun gear.

Here, the above explanations with respect to the embodiments in which the brake drive is embodied as a gear of the gearing of the magnetic brake and/or in which the brake drive is connected with the magnetic component such that the brake drive is provided as displaceably supported and jointly rotarily drivable together with the magnetic component apply.

A further embodiment relates to one of the above-described conveyor rollers, wherein the centrifugal device has a first and a second centrifugal disk and at least one centrifugal body arranged between the first and the second centrifugal disk, the first and the second centrifugal disk each being rotatably supported about a common axis of rotation and displaceably supported relative to each other in a direction parallel to the axis of rotation, wherein the at least one centrifugal body is guided in a centrifugal passage, the first and the second centrifugal disk having at least along a section of the centrifugal passage centrifugal disk faces corresponding to each other, at least one of the two centrifugal disk faces having an inclination causing the centrifugal disks to be pushed apart by the centrifugal body in a direction parallel to the axis of rotation, when the centrifugal body is displaced outward away from the axis of rotation.

The centrifugal body can be provided e.g. in the form of a ball, in particular in the form of a steel ball. Other types of centrifugal bodies are conceivable as well.

The first and the second centrifugal disk can be connected to each other in a rotationally locked manner or be rotatable about the common axis of rotation independently from each other. Here, the first and the second centrifugal disk can be displaceably supported on a common axle, e.g. the axle element, or on separate axles in a direction parallel to the axis of rotation. It is also conceivable that both centrifugal disks are rotatable, but only one of the two centrifugal disks, in particular the first centrifugal disk, is displaceably supported.

The centrifugal passage can be formed on the first centrifugal disk and/or on the second centrifugal disk. It is also conceivable that the centrifugal passage is formed on a third centrifugal disk arranged between the first and the second centrifugal disk.

In the case that parts of the centrifugal passage are formed both on the first and on the second centrifugal disk, a positive rotational lock between the centrifugal disks can be obtained via the centrifugal body, which is received on a side partially in the centrifugal passage of the first centrifugal disk and on the other side partially in the centrifugal passage of the second centrifugal disk. In the other cases, a frictional rotational lock between the centrifugal disks can be obtained via a frictional force between the first centrifugal disk and the centrifugal body as well as between the second centrifugal disk and the centrifugal body.

If the centrifugal device comprises several centrifugal bodies, several centrifugal passages can be provided, wherein in each of the centrifugal passages one centrifugal body can be guided. In particular, three centrifugal bodies can be provided, each of them being guided in a separate centrifugal passage. The three centrifugal passages can be arranged so as to be displaced in the circumferential direction by 120°. The centrifugal passage can have a portion that extends radially in the direction of the outer area of the centrifugal disks. The portion can take a curved course or a substantially straight course. For example, the portion can extend in parallel with a radial axis extending from the axis of rotation, or coincide with the radius.

Further, it is conceivable that both the centrifugal disk face of the first centrifugal disk and the centrifugal disk face of the second centrifugal disk have an inclination. The inclination can increase from an inner area of the centrifugal disk toward a radially more outward outer area of the centrifugal disk and toward the adjacent centrifugal disk. In other words, the areas of the centrifugal disk faces of the centrifugal disks which are located more outward toward the covering element can be arranged closer to each other than the areas of the centrifugal disk faces which are located more inwardly toward the axis of rotation. Accordingly, the centrifugal body can be pushed outward by the centrifugal force and thereby engange an oblique plane, which is formed by at least one of the centrifugal disk faces. A force component resulting from the centrifugal force, which acts in a direction parallel to the axis of rotation of the centrifugal disk, pushes the centrifugal disks apart. In doing so, the centrifugal body is supported on the other centrifugal disk.

A further embodiment relates to one of the above-described conveyor rollers, wherein at least one of the two centrifugal disks is biased by a spring element in the direction of the other centrifugal disk such that along its radial displacement path, the centrifugal body is in permanent physical contact with the two centrifugal disks.

Here, the spring force of the spring element can be such that the centrifugal body only develops a centrifugal force, which causes the centrifugal disks to be pushed apart against the spring force when it exceeds a first limit rotational speed. That is, the force component resulting from the centrifugal force, which acts on the centrifugal disks in a direction parallel to the axis of rotation of the centrifugal disks, exceeds the spring force only at a specific rotational speed, so that the centrifugal disks start moving apart from each other only at this first limit rotational speed. A component (magnetic component or braking component) of the magnetic brake, which is connected with one of the centrifugal disks, is pushed toward the other component only at this first limit rotational speed, so that the magnetic brake starts generating a braking torque only at the first limit rotational speed.

Moreover, the spring force of the spring element and the spring compression path can be such that the magnetic brake components are located in the braking position at a second limit rotational speed, in which the braking component is arranged fully within the magnetic field generated by the magnetic component.

A further embodiment relates to one of the above-described conveyor rollers, wherein the first centrifugal disk is configured as a part of the brake drive.

The first centrifugal disk can be attached directly or indirectly, i.e. via further parts, to the brake drive as a separate part in a rotationally fixed manner. It is also conceivable that the first centrifugal disk is attached directly or indirectly to the magnetic component in a rotationally fixed manner. In a further embodiment, the first centrifugal disk can be formed integrally with the brake drive, in particular with a brake drive formed as a gear of the gearing, and/or integrally with the braking component of the magnetic brake, or integrally with the magnetic component of the magnetic brake, in particular with a magnet carrier of the magnetic component. In particular, both the first centrifugal disk and the brake drive formed as a toothed gear of the gearing as well as the magnet carrier of the magnetic component of the magnetic brake can be formed integrally, i.e. be made of one piece. This integral component part can be rotatably supported on the axle element, which can be configured as a continuous axle.

A further embodiment relates to one of the above-described conveyor rollers, wherein the centrifugal device has a freewheeling function.

The freewheeling function can be such that the centrifugal device is actuated upon a rotation of the centrifugal disk(s) in a first direction of rotation when reaching a limit rotational speed, and that the centrifugal device is not actuated upon a rotation in a second direction of rotation, which is opposite to the first direction of rotation, even if a limit rotational speed is exceeded. In the case of the above-described embodiment, in which a centrifugal body is arranged between a first and a second centrifugal disk, the centrifugal body can be enabled, upon a rotation in the first direction of rotation, to move outward along the centrifugal passage, while the centrifugal body is fixed in the inner area of the centrifugal device upon a rotation in the second direction of rotation.

A further embodiment relates to one of the above-described conveyor rollers, wherein the freewheeling function is provided by an extension of the centrifugal passage about a freewheeling passage, the freewheeling passage being contiguous to the centrifugal passage on the radially inner side of the centrifugal passage and substantially extending in the circumferential direction of the centrifugal disks.

This configuration makes it possible for the centrifugal body to enter the freewheeling passage due to its inertia upon the start of the centrifugal disk(s) in the direction of the second direction of rotation, and to be held in the freewheeling passage when the rotation of the centrifugal disk(s) in the second direction of rotation continuous, so that it is prevented from entering the centrifugal passage. Here, the freewheeling passage can have a course differing slightly from a mere circumferential line, which extends away from the connection point of the freewheeling passage with the centrifugal passage in a spiral-like manner, for example, and slightly departs radially outward from the circumferential line. With such a course, the centrifugal body would be held in the area of the freewheeling passage during a rotation of the centrifugal disks due to the centrifugal force, the freewheeling passage extending radially furthest toward the covering element. Thus, due to the centrifugal force, during a rotation, the centrifugal body in the freewheeling passage would be prevented from being displaced toward the centrifugal passage, from then entering the centrifugal passage, and from finally actuating the centrifugal device.

A further embodiment relates to one of the above-described conveyor rollers, wherein the freewheeling function is provided by a centrifugal lock locking the centrifugal disks relative to each other in a direction parallel to the axis of rotation.

"Locking . . . in a direction parallel to the axis of rotation" means that the centrifugal disks are prevented from moving apart in this direction. This construction of the freewheeling function makes it possible for the centrifugal disks to be fixed in the axial direction relative to each other upon a start of the centrifugal disk(s) in the direction of the second direction of rotation, so that the centrifugal body is held in a radially inward position and is prevented from entering the centrifugal passage even if the centrifugal force increases. The lock can be established by a latching element, which can engage a corresponding locking face from behind upon locking.

Such a latching element can be arranged on one of the centrifugal disks, for example. The latching element can be integrally connected with the centrifugal disk. The locking face can be arranged on the other centrifugal disk, e.g. on a side of a passage opening which can be penetrated by the latching element in an axial direction.

A further embodiment relates to one of the above-described conveyor rollers, wherein one of the centrifugal disks is connected with the brake drive. In this embodiment, the first centrifugal disk, which is connected with the brake drive, can have stops that restrict or prevent a movement of the centrifugal disk in a direction parallel to the axis of rotation of the covering element. The stops can be formed as finger-like projections, in particular integrally with the first centrifugal disk. Recesses can be provided on the second centrifugal disk, through which the finger-like projections project, so that the finger-like projections can be supported on an abutment on the other side of the second centrifugal disk. This configuration ensures that the braking function of the conveyor roller can be maintained even if the spring element, which is provided for biasing the two centrifugal disks, breaks.

A second independent aspect for solving the object relates to a conveyor path comprising several conveyor rollers, at least one of which corresponds to an arbitrary conveyor roller described above with reference to the first aspect.

In the following, individual embodiments for solving the object will be described by way of example with reference to the figures. The individual, described embodiments partly include features that are not absolutely necessary for realizing the claimed subject matter, but which provide characteristics desired for specific applications. Thus, embodiments not including all features of the embodiments described below are also considered to be disclosed by the described technical teaching. In order to avoid unnecessary repetitions, specific features will only be mentioned with respect to individual embodiments described in the following. It is pointed out that the individual embodiments are not to be contemplated only individually, but also in combination. From this combination, the skilled person will see that individual embodiments can be modified by incorporating one or more feature of other embodiments. It is point out that a schematic combination of individual embodiments with one or more features described with respect to other embodiments can be desirable and expedient, and therefore is to be taken into consideration and be considered to be comprised by the description.

DETAILED DESCRIPTION OF THE PREFERRED EMBODIMENTS

Figure 1:
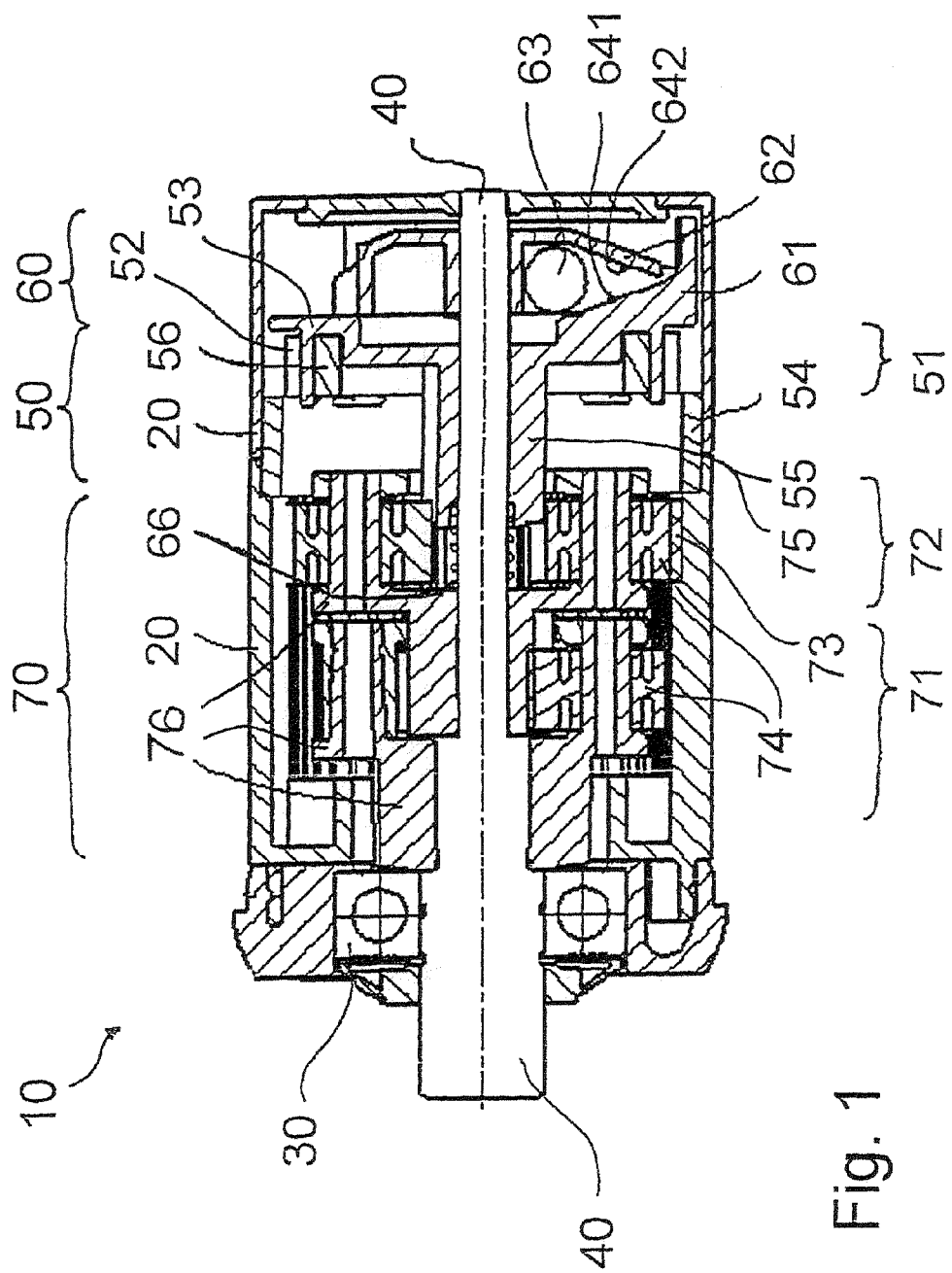
FIG. 1 shows a longitudinal view of an embodiment of a conveyor roller with an eddy-current brake in a rest position.

FIG. 1 shows an embodiment of a conveyor roller 10 with a covering element 20, which is supported on an axle via bearings 30, of which only one is shown. In the illustrated embodiment, the axle is configured in a two-part form, so that the conveyor roller 10 has an axle element 40, which in the conveyor roller 10 illustrated in FIG. 1 is arranged on the left side of the conveyor roller 10. Moreover, the conveyor roller 10 can have another axle element on the opposite side. A construction with a continuous axle is conceivable as well.

Within the covering element 20, the illustrated conveyor roller 10 has a gearing 70, a magnetic brake 50 configured as an eddy-current brake, and a centrifugal device 60.

The gearing 70 is configured as a two-stage planetary gearing with a first gearing stage 71 and a second gearing stage 72. Each of the gearing stages 71, 72 has a planet carrier 76 with three planetary gears 74 rotatably supported on the planet carrier 76, which are engaged with a ring gear 73 on the one hand, and with a sun gear 75 on the other hand. The sun gear 75 of the first gear stage 71 is integrally formed on the planet carrier 76 of the second gear stage 72. The sun gear 75 of the second gear stage is integrally formed on a brake drive 55 of the magnetic brake 50.

Other construction types of a planetary gearing are conceivable as well. Other gearing types that can transfer sufficient torque and ensure the desired gear ratio can be used instead of a planetary gearing.

Further, in the illustrated embodiment, the brake drive 55 is formed integrally with a magnet carrier 53 of the magnetic brake 50. Several magnets 52 are fixed to the magnet carrier 53. In the illustrated embodiment, the magnets are formed as flat bar magnets, which are arranged circumferentially around the magnet carrier 53, wherein the positive poles and the negative poles of the magnets alternatingly face radially outward. The arrangement of the magnets 52 can be better seen in FIG. 3.

Figures 2, 3:
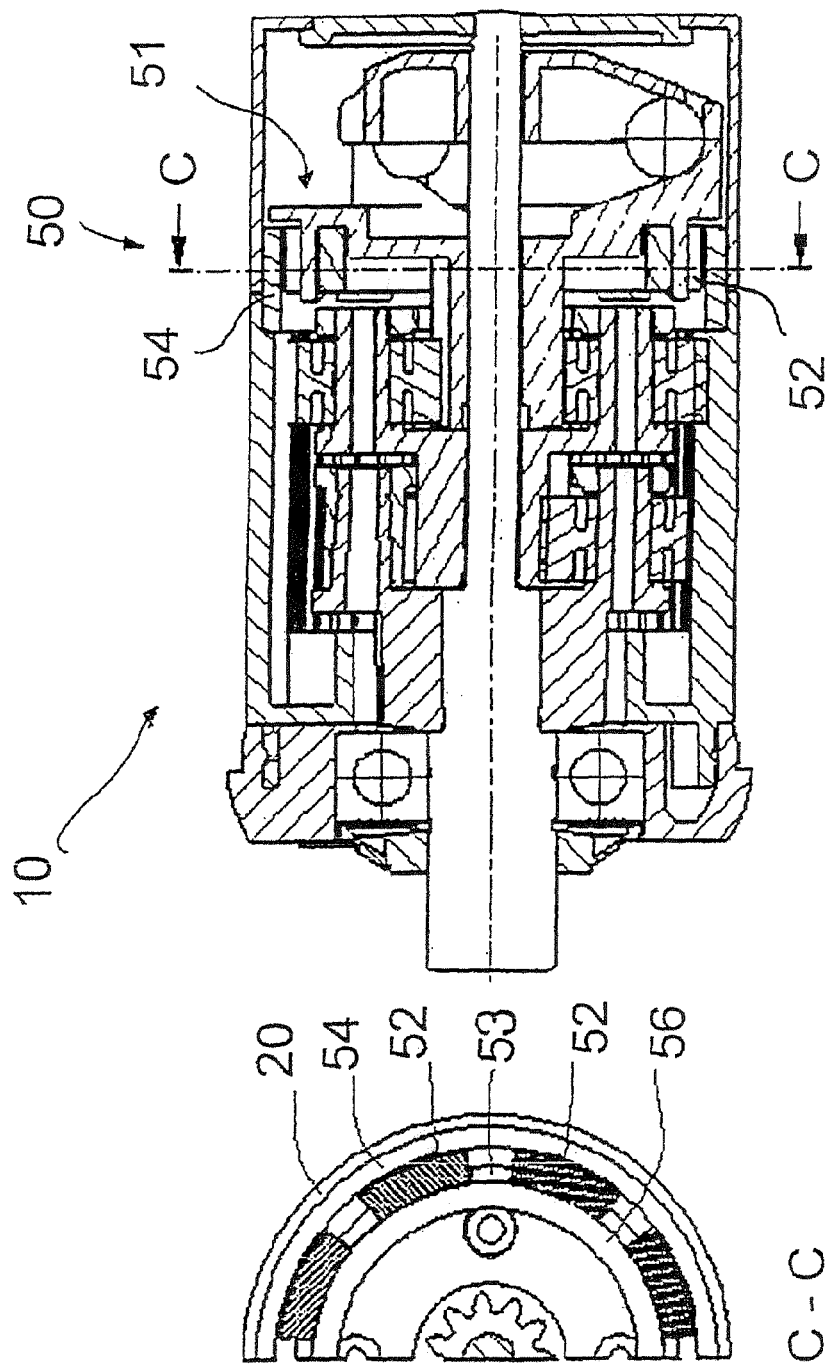
FIG. 2 shows a longitudinal view of the embodiment of the conveyor roller of FIG. 1 in a braking position.
FIG. 3 shows a side view of the eddy-current brake of the conveyor roller of FIG. 1.

FIG. 3 shows a side view of the eddy-current brake of the conveyor roller 10 of FIG. 1 along a line designated with C-C in FIG. 2.

Four out of eight magnets 52 are illustrated in FIG. 3. An anchor ring 56 for increasing the magnetic flow is arranged radially within the magnets. The anchor ring can also be referred to as a pole shoe. A braking component 54 and the covering element 20 are contiguous radially outside of the magnets. The magnets 52 and the braking component 54 are separated by a small air gap, so that the magnetic component 51 can rotate within the braking component 54.

In the illustrated embodiment, the braking component 54 of the magnetic brake 50 is in the form of a tube portion with a circular-cylindrical cross section. The braking component 54 can be made of brass, for example.

As is shown in FIG. 1, in the illustrated embodiment, the braking component 54 rests on the covering element 20 with the outer circumference thereof, which, as it is shown, in the longitudinal direction of the conveyor roller 10, is composed of at least two component parts, which abut against each other in a flush manner in the area of the braking component 54. In the illustrated embodiment, one of the two component parts is a housing element of the gearing 70, which thus is part of the gearing 70 and the covering element 20 likewise in this embodiment. The braking component 54 can be screwed or press-fit into one or both of the component parts that abut against each other in a flush manner. Other joining methods are conceivable as well. Moreover, it is conceivable that the covering element 20 merely is made of one or of more than two parts.

In the illustrated embodiment, the magnet carrier 53 is supported on an axle element 40 of the conveyor roller 10 in a rotatable and axially displaceable manner.

In the rest position shown in FIG. 1, the magnet carrier 53 is displaced to the position the furthest on the right in the figure. Here, the magnet carrier 53 is pushed to and held in this position by a spring element 66, which is embodied as a coil spring in the illustrated embodiment.

In this position, the magnets 52 of the magnetic component 51 are that far outside the magnetic field of the magnets 52 that the magnetic field only has a negligible influence on the braking component 54. In other words, in this position of the magnetic component 51 in relation to the braking component 54, no or only a negligible braking effect is achieved even if the magnetic component 51 rotates relative to the braking component 54. Therefore, this position is referred to as the rest position of the magnetic brake 50.

FIG. 2 shows the embodiment of the conveyor roller 10 of FIG. 1 in a position in which the magnetic component 51 is displaced into the tubular braking component 54 in the axial direction. In this position, the braking component 54 is penetrated by the magnetic field of the magnets 52 of the magnetic component 51, so that upon a rotation of the braking component 54 around the magnetic component 51, eddy currents are induced in the braking component 54 and a resulting braking torque is generated. This position is referred to as the braking position.

To displace the magnetic component 51 to the braking position, the magnetic component 51 is connected with a centrifugal device 60.

The centrifugal device 60 has a first centrifugal disk 61, a second centrifugal disk 62, and a centrifugal body 63. Upon a rotation of the component parts in a direction in which the conveyor roller is to be retarded, the centrifugal body 63 is pushed outward by the centrifugal force, wherein it pushes apart the first centrifugal disk 61 and the second centrifugal disk 62 in the axial direction with respect to the axis of rotation. To this end, in the illustrated embodiment, a first centrifugal disk face 641 and a second centrifugal disk face 642 are provided on the first centrifugal disk 61 and on the second centrifugal disk 62, respectively. In the illustrated embodiment, the two centrifugal disk faces 642, 642 have a radially outward inclination toward the adjacent centrifugal disk 61, 62, respectively.

Here, the first centrifugal disk 61 is formed integrally on the magnet carrier 53. Accordingly, the magnet carrier 53 is displaced to the braking position together with the first centrifugal disk 61 against the spring force of the spring element 66 when the centrifugal body 63 is pushed outward by the centrifugal force.

Figure 4:
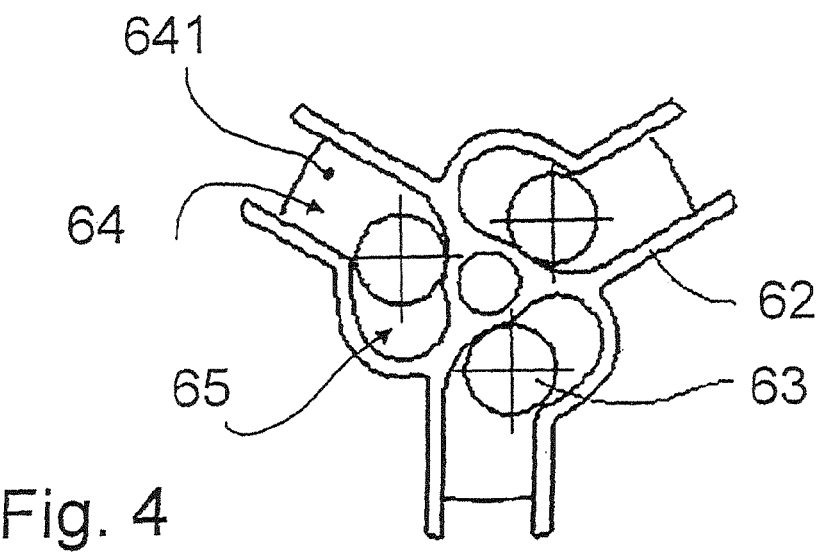
FIG. 4 shows a side view of a centrifugal disk of a centrifugal device of the conveyor roller during standstill of the conveyor roller.

FIG. 4 shows a side view of the second centrifugal disk 62 of the centrifugal device 60 of the conveyor roller during standstill of the conveyor roller 10.

In the illustrated view, it can be seen that the first centrifugal disk 623 has centrifugal passages 64, the first centrifugal disk face each being arranged at the bottom of the centrifugal passage 64. In the lateral direction, the centrifugal passages 64 are delimited by side walls that guide the three illustrated centrifugal bodies 63, which are each formed as a ball in the illustrated embodiment, when the balls are pushed outward by the centrifugal force. In FIG. 4, the balls are shown at the beginning of the three centrifugal passages 64, from where they move to the outside upon activation of the centrifugal brake, when the conveyor roller 10 rotates in a first direction of rotation.

Figure 5:
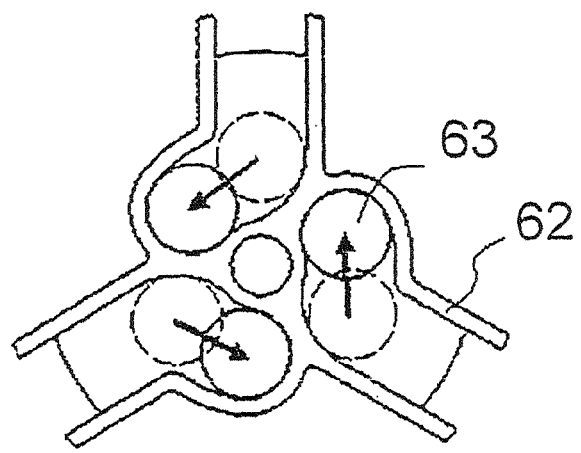
FIG. 5 shows a side view of the centrifugal disk of FIG. 4 upon a start of the conveyor roller in a direction of rotation in which a freewheeling function of the conveyor roller is activated.

When the conveyor roller 10 rotates in a second direction of rotation opposite to the first direction of rotation, the balls do not roll into the centrifugal passages 64, but from the positions shown in FIG. 4 in the direction of the arrows shown in FIG. 5. In the direction of the arrows there extend the freewheeling passages 65, which are connected with the centrifugal passages 64 and extend from the connection point between the centrifugal passages 64 and the freewheeling passages 65 in the circumferential direction. In the freewheeling passages 65, the balls are received upon a rotation in the direction of the second direction of rotation, so that an activation of the centrifugal brake is prevented.

Figure 6A:
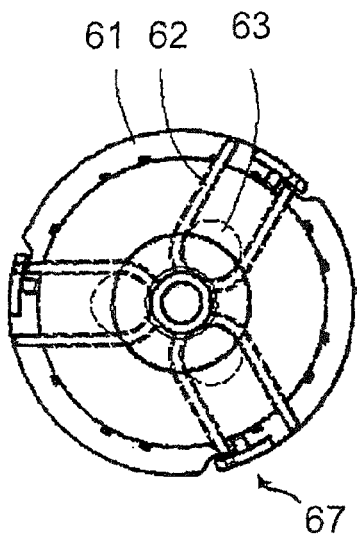
FIGS. 6a and 6b show two corresponding centrifugal disks of a further embodiment of a conveyor roller with a centrifugal lock in a locking position in which the freewheeling function is activated.
Figure 6B:
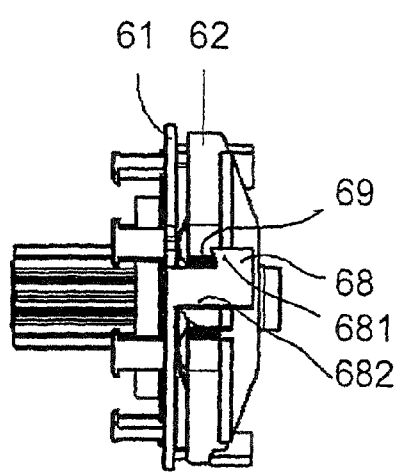

FIGS. 6a and 6b show two corresponding centrifugal disks 61, 62 of a further embodiment of a conveyor roller 10 with a centrifugal lock 67 in a locking position in which the freewheeling function is activated. Here, on the first centrifugal disk 61, on which the brake drive and the magnetic component 51 are provided in this embodiment, there are arranged three latching elements 68, which project into corresponding passage openings of the second centrifugal disk 62. The latching elements 68 of the centrifugal lock 67 each have a latching side 681, which each has a hook-shaped projection in the embodiment illustrated.

In the position of the centrifugal disks 61, 61 shown in FIGS. 6a and 6b, in which the freewheeling function is activated, the hook-shaped projections engage corresponding locking faces 69 of the second centrifugal disk 62 from behind. In this position of the centrifugal disks 61, 62, the centrifugal lock 67 locks the centrifugal disks 61, 62 relative to each other in a direction parallel to the axis of rotation. The centrifugal body cannot push the centrifugal disks 61, 62 apart even at higher speeds.

Figure 7A:
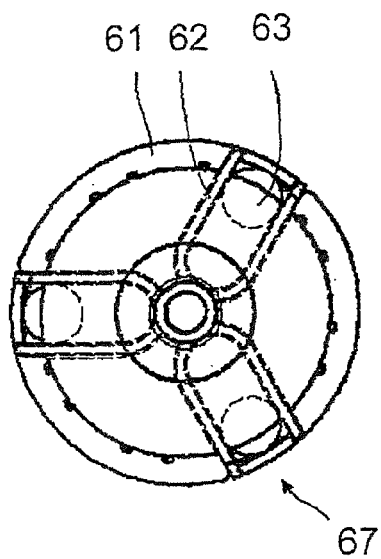
FIGS. 7a and 7b show the corresponding centrifugal disks of FIGS. 6a and 6b in an unlocked position in which the braking function is provided.
Figure 7B:
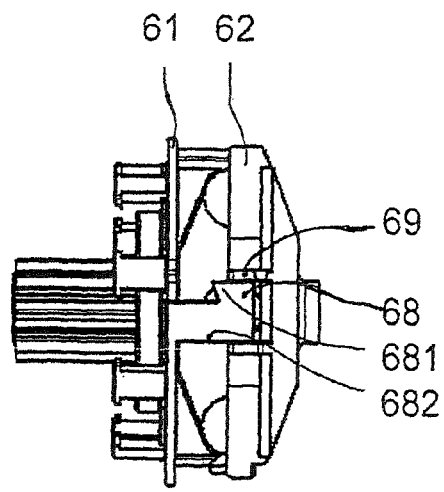

FIGS. 7a and 7b show the corresponding centrifugal disks 61, 62 of FIGS. 6a and 6b in an unlocked position in which the braking function of the magnetic brake 50 is provided.

In this position of the centrifugal disks 61, 62, the latching element 68 does not lock the two centrifugal disks 61, 62 relative to each other. Instead, in this position, the two centrifugal disks 61, 62 can be pushed apart by the centrifugal body relative to each other, so that the magnetic brake 50 can provide its braking force as the speed increases.

The centrifugal lock 67 can be configured such that the latching element 68 is permanently arranged in the corresponding passage openings of the second centrifugal disk 62. For example, the second centrifugal disk 62 can be rotatably supported on the axle element 40 and be arranged in a manner turnable relative to the first centrifugal disk 61, wherein a turn can be restricted by the latching element 68 and the corresponding passage opening.

If, in such a configuration, the conveyor roller 10 starts in a direction in which the braking function of the magnetic brake 50 is to be provided at higher speeds, the two centrifugal disks 61, 62 can turn with respect to each other until an abutment side 682 of the latching element abuts on one side of the corresponding passage opening corresponding to the latching element. The two centrifugal disks 61, 62 can move apart in an axial direction due to a corresponding, e.g. rectilinear configuration of the abutment side 682.

If the conveyor roller 10 starts in the other direction in which not braking function is to be provided even at higher speeds, the two centrifugal disks 61, 62 turn relative to each other until the hook-shaped projection of the locking side 681 of the latching element 68 engages the locking face 69 from behind on the other side of the passage opening and locks the two centrifugal disks 61, 62 in the axial direction relative to each other, so that the centrifugal body is held in a radially inward position even at higher speeds and is prevented from entering the centrifugal passage 64 even if the centrifugal force increases.

Figure 8:
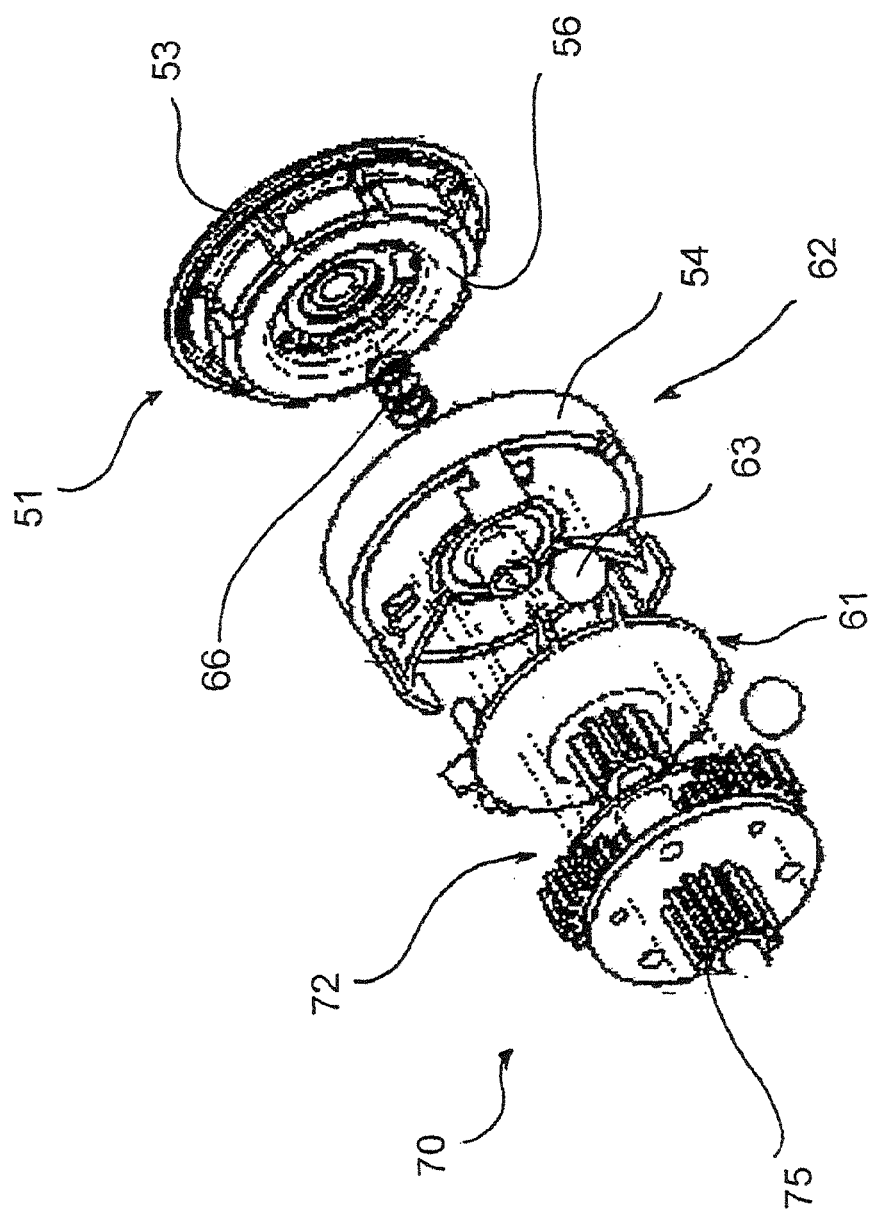
FIG. 8 shows an exploded view of components of a further embodiment of the conveyor roller with a modified centrifugal device and a modified magnetic brake.

FIG. 8 shows an exploded view of components of a further embodiment of the conveyor roller 10 with a modified centrifugal device 60, which also has a first centrifugal disk 61, a second centrifugal disk 62, and ball-shaped centrifugal bodies 63 arranged between the centrifugal disks 61, 62. Further, the embodiment shown in FIG. 8 has a modified magnetic brake 50 compared to the above described design.

Figure 9B:
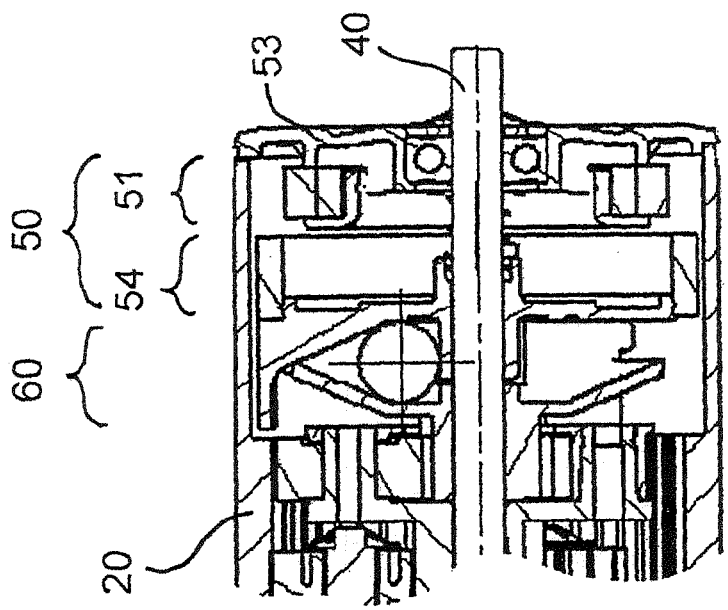
FIGS. 9a and 9b show the embodiment of FIG. 8 in a longitudinal view and a cross section through the conveyor roller.
Figure 9A:
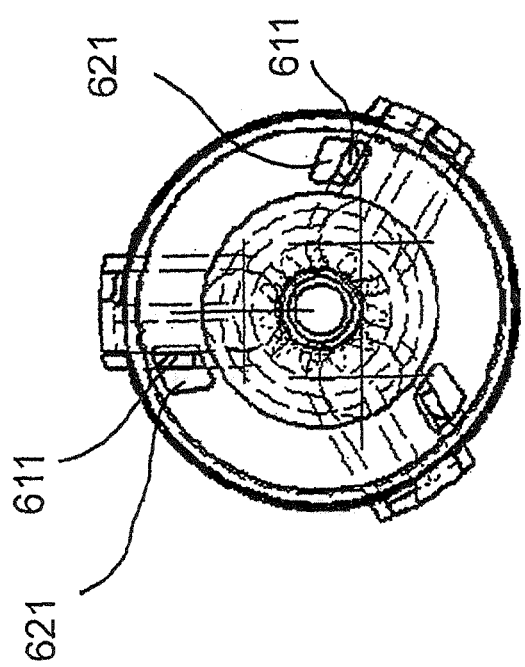

The embodiment of FIG. 8 is shown in an assembled state in FIG. 9b in a longitudinal view. FIG. 9a shows a cross section through the conveyor roller, in which the second centrifugal disk 62 is shown.

Figure 10:
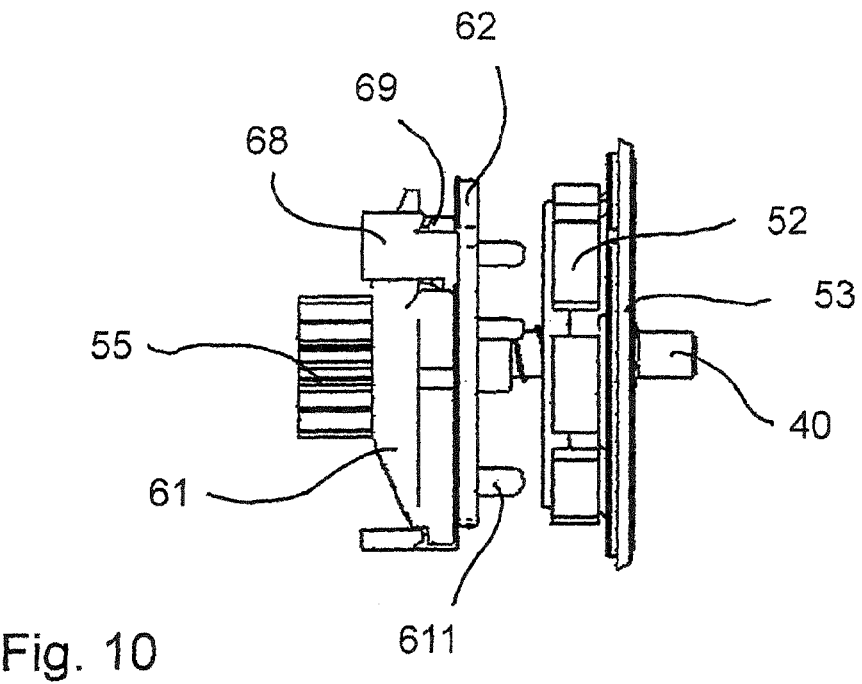
FIG. 10 shows a side view of the first centrifugal disk 61 and the second centrifugal disk 62 of the embodiment of FIG. 8.
Figure 11:
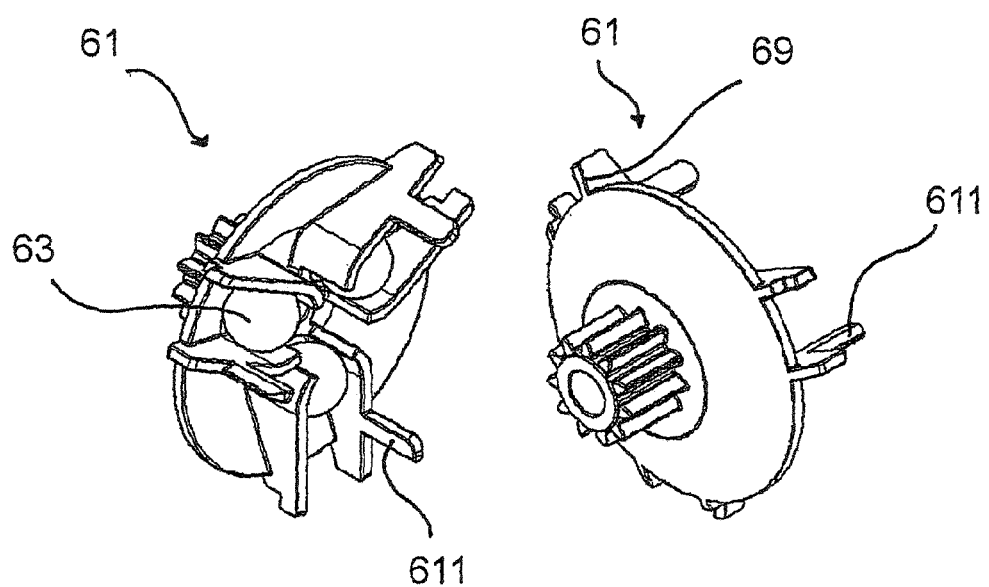
FIG. 11 shows two isometric views from different directions of the first centrifugal disk 61 of the embodiment of FIG. 8.

The first centrifugal disk 61 and the second centrifugal disk 62 of the embodiment shown in FIGS. 8 and 9 are shown in a side view in FIG. 10. Moreover, the first centrifugal disk 61 is shown in two isometric views from different directions in FIG. 11.

The centrifugal device 60 and the magnetic brake 50 of this further embodiment will be described in the following with reference to FIGS. 8 to 11. Here, mention will only be made of differences with respect to the embodiments described above with reference to FIGS. 1 and 7 in order to avoid unnecessary repetitions. It is pointed out that the centrifugal device 60 and the magnetic brake 50 can be used individually or together to modify the embodiments described above with reference to FIGS. 1 and 7. Conversely, the remaining constructional features of the conveyor roller can also be used individually or in combination for the embodiment of the variant of the conveyor roller illustrated in FIGS. 8 to 11.

In the illustrated magnetic brake, the magnet carrier, as shown in FIG. 9b, is fixedly connected with the covering element 20. On the front side, the covering element is pressed, screwed, or welded onto a circumferential surface of the magnet carrier 53. In the illustrated embodiment, the magnet carrier 53 is formed as a front side roller cover. The magnet carrier 53 is rotatably supported on the axle element 40 via a roller bearing. Accordingly, the magnet carrier 53 can rotate about the axle element 40 together with the covering element 20.

Attached on the magnet carrier 53 is an annular pole shoe, which can also be referred to as an anchor ring 56. Magnets 52 with alternating polarities are anchored on the radially outward, outer circumferential surface of the anchor ring 56. The anchor ring 56 is made of a ferromagnetic material, which conducts and bundles the magnetic flow due to the high permeability thereof. In the illustrated embodiment, the magnet carrier 53 and the covering element 20 are also made of metal or a metal alloy, in particular of a ferromagnetic material with a high permeability, so that a scattering of the force line exiting the poles of the magnets can be reduced and the magnetic flow in the circular gap between the magnets 52 and the covering element 20 is increased.

In the gap between the magnets 52 and the covering element 20 there can be displaced the circular-cylindrical braking component 54 toward the braking position thereof.

In the illustrated embodiment, the first centrifugal disk 61 is integrally connected with the brake drive 55. In this embodiment, the brake drive 55 is formed as a sun gear of a second gear stage 72 of a gearing 70.

The first centrifugal disk 61 has spacers 611, which restrict or prevent a movement of the first centrifugal disk 61 toward the magnet carrier 53 in a direction parallel to the axis of rotation of the covering element. Thus, it is ensured that the brake drive 55 formed as a sun gear cannot be disengaged from the corresponding planetary gears. Hence, the braking function is also ensured if the spring element 66, which biases the second centrifugal disk 62 toward the first centrifugal disk 61, breaks. In this case, the second centrifugal disk 62 with the braking component 54 arranged thereon can be displaced to the braking position and would remain in the braking position even at low speeds. In this case, the conveyor roller would generate a braking torque already at low speeds, so that the defect of the spring element can be easily detected from outside, so that the conveyor roller can be exchanged or serviced.

In the illustrated embodiment, the spacers 611 are formed by three finger-shaped projections arranged integrally on the first centrifugal disk 61. On the second centrifugal disk 62 there are provided recesses 621, which correspond to the spacers 611, through which the finger-shaped projections project.

The invention claimed is:

1. A conveyor roller (10), comprising a covering element (20), an axle element (40), and a magnetic brake (50) having a magnetic component (51) and a braking component (54) corresponding to the magnetic component (51), the covering element (20) being rotatably supported about an axis of rotation relative to the axle element (40), the magnetic brake (50) being kinematically provided between the axle element (40) and the covering element (20) and being connected to the axle element (40) and the covering element (20) such that a rotation of the covering element (20) about the axis of rotation can be retarded by the magnetic brake (50), wherein the magnetic component (51) and the braking component (54) are arranged displaceably relative to each other between a rest position and a braking position, and wherein further a centrifugal device (60) for a rotational speed-dependent displacement of at least one of the magnetic brake components (51, 54) is provided between the rest position and the braking position, and a gearing (70) arranged within the conveyor roller so that a relative rotary movement between the covering element (20) and the axle element (40) can be converted via the gearing (70) into a rotary driving motion of a brake drive (55) of the magnetic brake (50).

2. The conveyor roller (10) according to claim 1, wherein the magnetic component (51) has a magnet carrier (53) and at least one magnet (52) fixed to the magnet carrier (53).

3. The conveyor roller (10) according to claim 1, wherein the braking component (54) is formed as a tube portion with a circular cylinder jacket-shaped cross section.

4. The conveyor roller (10) according to claim 1, wherein the braking component (54) is configured as a fixed component of the covering element, and wherein in the braking position the magnetic component (51) is displaced at least partially within the braking component (54) in a direction parallel to the axis of rotation of the covering element.

5. The conveyor roller (10) according to claim 1, wherein in the rest position, the magnetic component (51) is arranged outside the braking component (54) in a direction parallel to the axis of rotation of the covering element.

6. The conveyor roller (10) according to claim 1, wherein a portion of the brake drive (55) is formed as a gear of the gearing (70) of the magnetic brake.

7. The conveyor roller (10) according to claim 1, wherein the brake drive (55) is connected with the braking component (51) such that the brake drive (55) is provided as displaceably supported and jointly rotationally drivable together with the braking component (51).

8. The conveyor roller (10) according to claim 1, wherein the gearing includes a planetary gearing having a sun gear (75) and at least one planetary gear (74), and wherein the sun gear (75) of the planetary gearing is formed as a portion of the brake drive (55) and is displaceably supported relative to the at least one planetary gear (74) in a direction parallel to the axis of rotation of the sun gear (75).

9. A conveyor roller (10), comprising a covering element (20), an axle element (40), and a magnetic brake (50) having a magnetic component (51) and a braking component (54) corresponding to the magnetic component (51), the covering element (20) being rotatably supported about an axis of rotation relative to the axle element (40), the magnetic brake (50) being kinematically provided between the axle element (40) and the covering element (20) and being connected to the axle element (40) and the covering element (20) such that a rotation of the covering element (20) about the axis of rotation can be retarded by the magnetic brake (50), wherein the magnetic component (51) and the braking component (54) are arranged displaceably relative to each other between a rest position and a braking position, and wherein further a centrifugal device (60) for a rotational speed-dependent displacement of at least one of the magnetic brake components (51, 54) is provided between the rest position and the braking position, the centrifugal device (60) having a first centrifugal disk (61) and a second centrifugal disk (63) and at least one centrifugal body (63) arranged between the first centrifugal disk (61) and the second centrifugal disk (62), the first centrifugal disk (61) and the second centrifugal disk (62) each being rotatably supported about a common axis of rotation and displaceably supported relative to each other in a direction parallel to the axis of rotation, wherein the at least one centrifugal body (63) is guided in a centrifugal passage (64), the first centrifugal disk (61) and the second centrifugal disk (62) having at least along a section of the centrifugal passage (64) centrifugal disk faces (641, 642) corresponding to each other, at least one of the two centrifugal disk faces (641, 642) having an inclination causing the centrifugal disks (61, 62) to be pushed apart by the centrifugal body (63) in a direction parallel to the axis of rotation, when the centrifugal body (63) is displaced outward away from the axis of rotation.

10. The conveyor roller (10) according to claim 9, wherein at least one of the two centrifugal disks (61, 62) is biased by a spring element (66) toward the other centrifugal disk (61, 62) such that along its radial displacement path, the centrifugal body (63) is in permanent physical contact with the two centrifugal disks (61, 62).

11. The conveyor roller (10) according to claim 9, wherein the first centrifugal disk (61) is configured as a part of the brake drive (55).

12. The conveyor roller (10) according to claim 9, wherein the centrifugal device (60) has a freewheeling function.

13. The conveyor roller (10) according to claim 12, wherein the freewheeling function is provided by an extension of the centrifugal passage (64) about a freewheeling passage (65), the freewheeling passage (65) being contiguous to the centrifugal passage (64) on the radially inner side of the centrifugal passage (64) and substantially extending in the circumferential direction of the centrifugal disks (61, 62).

14. The conveyor roller (10) according to claim 12, wherein the freewheeling function is provided by a centrifugal lock (67) locking the centrifugal disks (61, 62) relative to each other in a direction parallel to the axis of rotation.

* * * * *